(12) United States Patent
Ahmed et al.

(10) Patent No.: US 7,505,994 B2
(45) Date of Patent: Mar. 17, 2009

(54) XPATH EXPRESSION BINDING USING XPATH TRACKER WITH DYNAMIC OR STATIC PATH EVALUATION

(75) Inventors: Haroon Ahmed, Renton, WA (US); Laurent Mollicone, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 353 days.

(21) Appl. No.: 11/320,208

(22) Filed: Dec. 28, 2005

(65) Prior Publication Data

US 2007/0150504 A1   Jun. 28, 2007

(51) Int. Cl.
*G06F 17/30* (2006.01)
(52) U.S. Cl. .......................................... 707/102; 707/2
(58) Field of Classification Search .................. 707/2, 707/102; 715/513
See application file for complete search history.

(56) References Cited

U.S. PATENT DOCUMENTS

2002/0194185 A1* 12/2002 Coates et al. ............... 707/100
2004/0088652 A1*  5/2004 Abe et al. .................... 715/513

* cited by examiner

*Primary Examiner*—Etienne P LeRoux

(57) ABSTRACT

Various embodiments are disclosed relating to binding an application to one or more nodes of a tree (e.g., XML tree or XML document). According to an example embodiment, a tree path navigator (e.g., XPath navigator) may be invoked or called to dynamically evaluate a tree path expression to track one or more nodes identified by the expression. In another example embodiment, a notification interface may be provided for one or more nodes in the tree to provide a change notification when one of the nodes is modified. The application may be notified of a change to any node identified by the tree path expression.

20 Claims, 5 Drawing Sheets

XPATH EXPRESSION BINDING USING XPATH TRACKER WITH DYNAMIC OR STATIC PATH EVALUATION

BACKGROUND

Data may be represented in a variety of formats and using a number of different languages. One example language for representing data is XML (eXtensible Markup Language). Also, XML Path (XPath) is a language that allows nodes or elements in an XML document to be identified or located through a path expression known as an XPath expression. Binding to an XPath expression is common function for various software components. Current approaches to XPath expression binding are typically limited and inflexible.

SUMMARY

Various embodiments are disclosed relating to an XPath expression binding using an XPath tracker with dynamic or static path evaluation.

According to an example embodiment, a technique is provided to bind an application to one or more data nodes. A tree path expression (e.g., XPath expression) may be received from an application. The tree path may correspond to (or identify) one or more nodes that may be used by the application or of interest to the application, for example. A tree path navigator (e.g., XPath navigator) may be called or invoked to dynamically evaluate the tree path expression in order to track one or more nodes identified by the tree path expression. For example, an XPath navigator may be invoked or called to dynamically evaluate an XPath expression and to obtain (from the Navigator) one or more nodes that participate in the evaluation of the XPath expression. A dependency node set may be generated based on one or more nodes obtained from the Xpath navigator that may participate in the evaluation of the XPath expression. Also, the application may be notified when a change or modification to a node in the tree is detected by the tree path navigator.

In another example embodiment, a technique is provided to bind an application to one or more data nodes. A tree path expression (e.g., XPath expression) may be received from an application. The tree path may correspond to one or more nodes that may be used by the application or of interest to the application, for example. The expression may be manually or statically evaluated to track one or more nodes identified by (or corresponding to) the tree path expression. For example, an XPath expression may be manually or statically evaluated to obtain one or more nodes that participate in the evaluation of the XPath expression. A dependency node set may be generated based on the nodes identified from the static or manual evaluation of the tree path expression. Also, a notification interface may be provided for one or more nodes in the tree of nodes (e.g., XML tree) to provide a notification if the node is changed or modified. The application may be notified when a change or modification to a node in the tree occurs.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Figure 1:
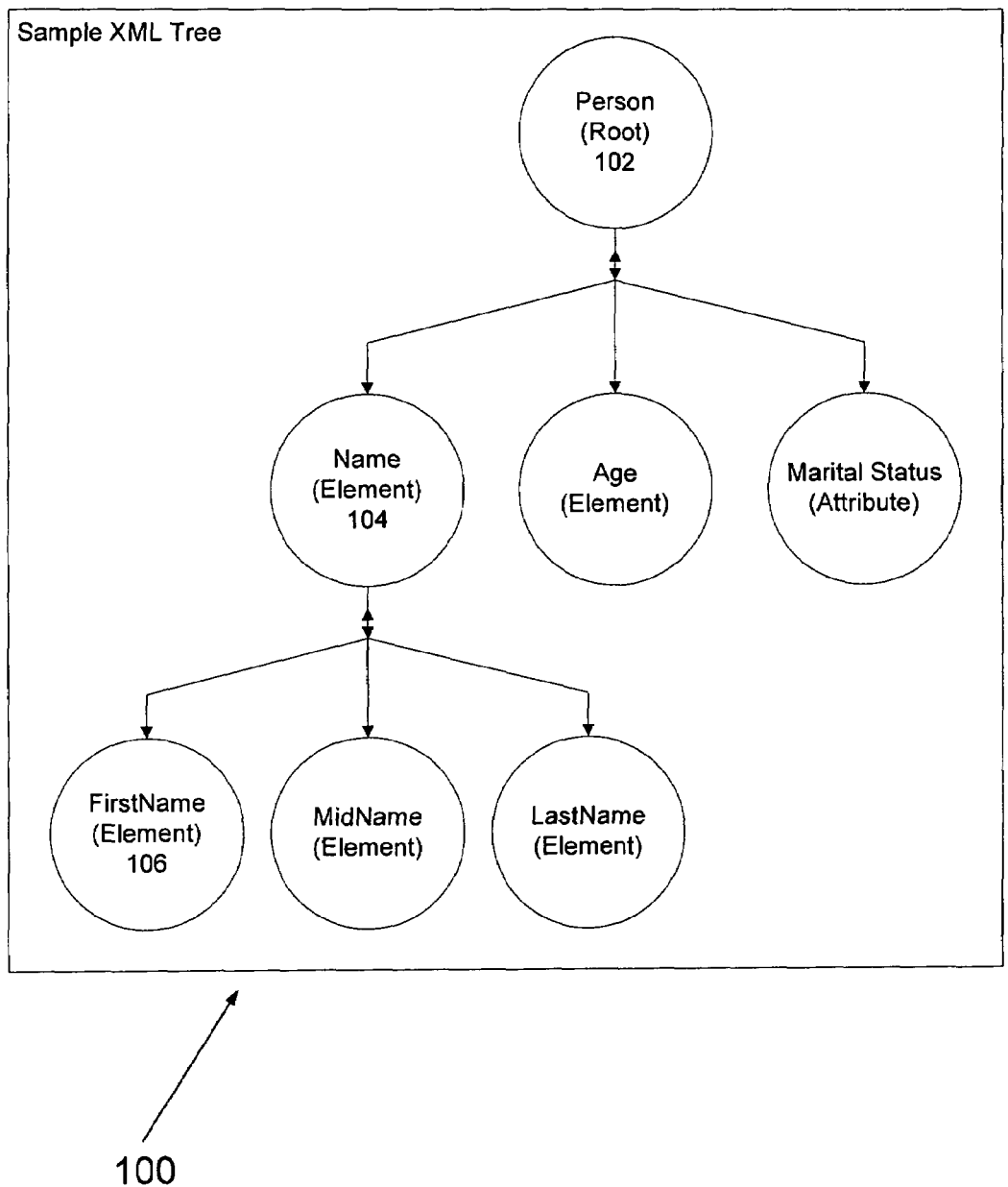
FIG. 1 is a diagram of a sample XML tree or XML document according to an example embodiment.

Referring to the Figures in which like numerals indicate like elements, FIG. 1 is a diagram of a sample XML tree 100 or XML document according to an example embodiment. In an example embodiment, data may be represented as an XML (Extensible Markup Language) document. XML is merely an example language and the various embodiments are not limited thereto. Other languages may be used to represent data. According to an example embodiment, an XML document may be viewed as a logical ordered tree, with multiple data nodes. For example, in the sample XML tree 100 of FIG. 1, a Person node 102 may include children nodes: Name (104), Age and MaritalStatus. The Name node 104 may include children nodes: FirstName (106), MidName, and LastName. This is merely an example of an XML tree or XML document.

XML Path (XPath) is a language that allows nodes or elements in an XML document to be identified or located through a path expression known as an XPath expression. For example, the XPath expression/Person may identify one or more nodes (or Persons) at that location or identified by that expression, including any children. In the example XML tree 100 in FIG. 1, the XPath expression/Person may identify the Person node 102 and the children nodes (name, age and marital status), according to an example embodiment. The XPath expression/Person/Name may identify the name node 104 and its children nodes (FirstName, MidName and LastName). XPath is merely an example language to identify or locate nodes in a document, and the various features and embodiments described herein are not limited thereto. Other language may be used to identify or locate data nodes in a document.

The XPath expression/Person/Name/FirstName may identify the FirstName node 106 in one embodiment. If there are several first names, then this expression, when evaluated, may return all the first names (e.g., Smith and Jones if these are two FirstName nodes), for example. These are merely some simple examples of how a language, such as XPath, may provide path expressions to identify one or more nodes within a tree of nodes or structured document (such as within an XML tree, for example). Other approaches or syntax may be used to allow a path expression to identify one or more nodes. For example, qualifiers may be used to identify only certain nodes, e.g., only Persons with Age >32, for example.

Figure 2:
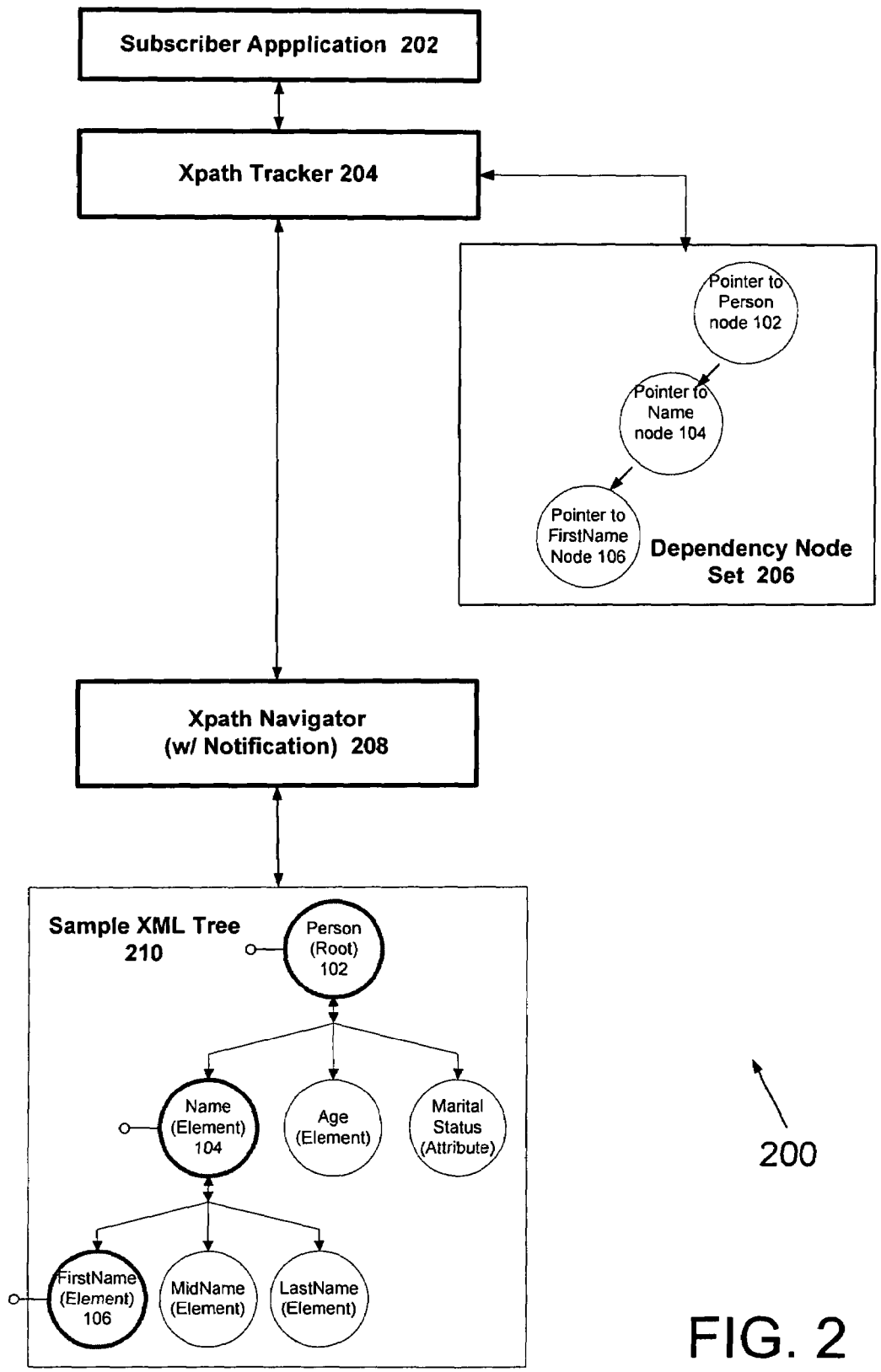
FIG. 2 is a block diagram of a system to bind an application to one or more data nodes according to an example embodiment.

FIG. 2 is a block diagram of a system to bind an application to one or more data nodes according to an example embodiment. System 200 may include a subscriber application 202, which may be any application, such as an application program or software component. For example, application 202 may be an address book program or a contacts list program, or any other application. An address book or contacts list program is merely one example application, and many other applications may be used as application 202. In an example embodiment, subscriber application 202 may use or receive data from one or more nodes of XML tree 210. The sample XML tree 210 may provide a structured list of names, addresses, telephone numbers, marital status, age, etc. for many different people. XML tree (or XML document) 210 may include a variety of data nodes, such as a person node 102, a Name node 104 and a FirstName node 106, and other nodes. Some of this data (data nodes describing different people) may be maintained in or used by application 202, or by other applications (not shown).

An XPath navigator 208 may be coupled to XML tree 210, and may, for example, evaluate an XPath expression (e.g., parse the expression, navigate or traverse the XML tree based on the expression), and provide one or more nodes identified by the expression. For example, the XPath navigator 208 may evaluate the XPath expression/Person/Name/FirstName and provide or output the FirstName node 106 (which is the node identified by the expression).

In addition to providing the node identified by an expression, XPath navigator 208 may provide (or output) one or more nodes (e.g., memory addresses or pointers) that may be associated with or may participate in the evaluation of an XPath expression. This feature may, for example, facilitate dynamic tracking of nodes. For example, upon request, XPath navigator 208 may evaluate the expression/Person/Name/FirstName and may provide or output one or more nodes (or even all of the nodes) that may participate in the evaluation of that expression. These nodes may be provided or output, for example, as the XPath navigator 208 traverses or navigates the XML tree 100 based on the XPath expression. For example, while traversing or navigating the XML tree 100 based on the expression/Person/Name/FirstName, XPath navigator 208 may output or provide three nodes, including person node 102, Name node 104, and FirstName node 106, e.g., as the navigator traverses or navigates across these nodes, since these nodes participate in the evaluation of the XPath expression/Person/Name/FirstName). XPath navigator 208 may also provide a notification when a node within XML tree 210 has been modified or changed, for example.

An XPath tracker 204 may be coupled to application 202 and to XPath navigator 208, for example. According to an example embodiment, XPath tracker 204 may receive a tree path expression from application 202, e.g., which may indicate one or more nodes being used or of interest to application 202. According to an example embodiment, subscriber application 202 may be bound to (or associated with) one or more data nodes of interest in XML tree 210 through, for example one or more of: an XPath expression(s) identifying the node(s) of interest or being used by application 202, XPath tracker 204, and/or XPath navigator 208. This binding or association between application 202 and nodes in XML tree 210, according to an example embodiment, may allow application 202 to obtain data nodes from XML tree 210, and to be notified when the data in XML tree 210 has been modified or changed. Therefore, in this manner, application 202 may maintain current data, e.g., keep up with changes to data in XML tree 210. In an example embodiment, subscriber application 202, XPath tracker 204, and XPath navigator 208 may be software programs or software components which may be executed or run on a processor, computer or other computing device, for example.

According to an example embodiment, XPath tracker 204 may receive an XPath expression from application 202. XPath tracker 204 may invoke (e.g., call or request) XPath navigator 208 to dynamically evaluate the XPath expression (e.g., parse and navigate/traverse the XML tree 210 based on the received XPath expression) in order to track one or more nodes identified by the XPath expression. For example, the XPath tracker 204 may track one or more nodes identified by the XPath expression by receiving one or more nodes from the XPath navigator 204 that participate in the evaluation of the XPath expression. For example, based on a request from XPath tracker 204, XPath navigator 208 may traverse XML tree 210 based on the example XPath expression/Person/Name/FirstName, providing the person node 102, name node 104 and FirstName node 106 to XPath tracker 204 as navigator 208 traverses across these nodes. This may allow the XPath tracker 204 to track or identify the nodes that are associated with (or participate in) the evaluation of this XPath expression. The nodes provided by XPath navigator 208 to XPath tracker 204, based on evaluation of the expression, may include, for example, the value(s) of the node(s) and any children node, and a pointer to the node identified by the expression.

As noted above, an XPath expression provided by application 202 to XPath tracker 204 may, for example, identify a node of interest to application 202. This XPath expression may then be provided to XPath navigator 208 to obtain one or more (or all) of the nodes that participate in the evaluation of that XPath expression. By obtaining the nodes that participate or associated with the evaluation of that XPath expression, this may allow XPath tracker 204 to identify a group of nodes, that, if changed or modified, may impact the nodes of interest to application 202. In an example embodiment, XPath tracker 204, upon detecting a change or modification to any of the nodes that participate in the evaluation of the XPath expression (which identifies the node of interest) may then notify the application that a change to a node has been detected (which may cause the application to re-evaluate the corresponding XPath expression to obtain updated data).

Therefore, according to an example embodiment, XPath tracker 204 may generate a dependency node set 206 based on nodes (e.g., node values and/or pointers) provided by the XPath navigator 208. Dependency node set 206 may be a set of nodes (or information related to such nodes) that participate in (or associated with) the evaluation of an XPath expression (or multiple XPath expressions). In an example embodiment, the XPath tracker 204 may generate the dependency node set 206 dynamically, e.g., as XPath navigator 208 parses the expression and navigates the XML tree 210 to identify the node(s) that may participate in the evaluation of the XPath expression. The nodes used in application 202 (e.g., nodes of interest to application 202) may be identified by one or more XPath expressions received from application 202, and may be tracked by XPath tracker 204 based on (or using) the dependency node set 206.

In an example embodiment, the dependency node set 206 generated by XPath tracker 204 may include pointers to the one or more nodes based on the XPath expression. Therefore, according to an example embodiment, the dependency node set 206 generated by XPath tracker 204 may be in the form of pointers (e.g., memory addresses) to each node, including each node identified by an expression (e.g., FirstName node 106), as well as the nodes that participate in the evaluation of the expression (e.g., Person node 102 and Name node 104). The dependency node set 206 may or may not include the actual nodes themselves.

As shown in FIG. 2, the node of interest to application 202, in this example, may include FirstName node 106, e.g., based on an example XPath expression/Person/Name/FirstName. Therefore, the dependency node 206 set generated by XPath tracker 204, in this simple example, may include a pointer to (or memory address of) person node 102 (the node identified by the expression), as well as pointers to other nodes that may participate in the evaluation of that XPath expression, such as, for example, a pointer to person node 102 and a pointer to Name node 104. This is merely an example, and is used to illustrate a number of features, according to example embodiments.

Because the nodes or data used by application 202 may depend from the nodes of XML tree 210, it may be desirable for application 202 to receive a notification if a change or modification is made to one or more nodes of XML tree 210 (e.g., if a new person is added or an existing person is removed, if a new field or element or attribute is added, . . . ). Therefore, according to an example embodiment, XPath tracker 204 may provide a notification to application 202 when a node within dependency node set 206 is modified or changed. The dependency node set 206 may include the nodes of interest to application 202 (identified by one or more XPath expressions) and the nodes that participate in an evaluation of such XPath expressions. If a change is made to node(s) that participate in the evaluation of an expression, this change may impact the node identified by the expression (node of interest). Thus, if a change of modification is detected regarding the node of interest (identified by the expression) and any of the dependent nodes (that participate in the evaluation of the expression), the XPath tracker 204 may provide a notification to the application 202 that a change has occurred.

For example, XPath tracker 204 may receive a notification from the XPath navigator 208 when a change or modification has been made to XML tree 210 or to one or more nodes within XML tree 210. This change notification may be provided to XPath tracker 204 in the form, for example, as a pointer or memory address of the node changed, the old value, and the new value (e.g., pointer to node, age=32, age=35, where new age is 35).

According to an example embodiment, XPath tracker 204 may then determine, based on the change notification from XPath navigator 208, whether the change or modification to the XML tree impacts the dependency node set 206. XPath tracker 204 may, for example, compare the pointer in the received change notification to the pointers in the dependency node set. If there is a match, then this indicates such a change may impact (or affect) the dependency node set 206, and may impact the node(s) of interest to application 202. XPath tracker 204 may then notify the application 202 of the change or modification to the node if the change impacts the dependency node set 206. In other words, a notification may be sent to application 202 if the change relates to or may impact the subset of nodes used by application 202, for example. As noted above, this subset of nodes used by application 202 may be tracked by XPath tracker 204 via the dependency node set 206 (including a set of nodes that may participate in the evaluation of the XPath expression that identifies the node of interest).

For example, if a change to Person node 102 occurs, this change may be detected by XPath navigator 208 and a change notification may be sent to XPath tracker 204 with the pointer to Person node 102, the old value and the new value. XPath tracker 204 may then compare the pointer in the received change notification to the pointers of the dependency node set 206. In this example, the received pointer would match one of the pointers in the dependency node set 206, and XPath tracker 204 may notify application 202 that the underlying data of interest (e.g., a node of XML tree 210 used by application 202) has been modified or changed. XPath tracker 204 may provide the pointer to the changed node to application 202, for example. XPath tracker 204 may or may not provide the new values or changes values for the node to application 202 as part of the notification to application 202 of the change.

In another example, if a change was detected for age node in XML tree 210, a change notification would be received by XPath tracker 204, including a pointer to the age node. However, in this case, the pointer for this age node would not match any of the pointers in the dependency node set 206, and thus, no notification would be forwarded to application 202 (e.g., because this change does not impact the data or nodes being used by or of interest to application 202), according to an example embodiment.

In another example embodiment, XPath navigator 208 may provide a change notification to XPath tracker 204 only for those nodes corresponding to the dependency node set 206.

Figure 3:
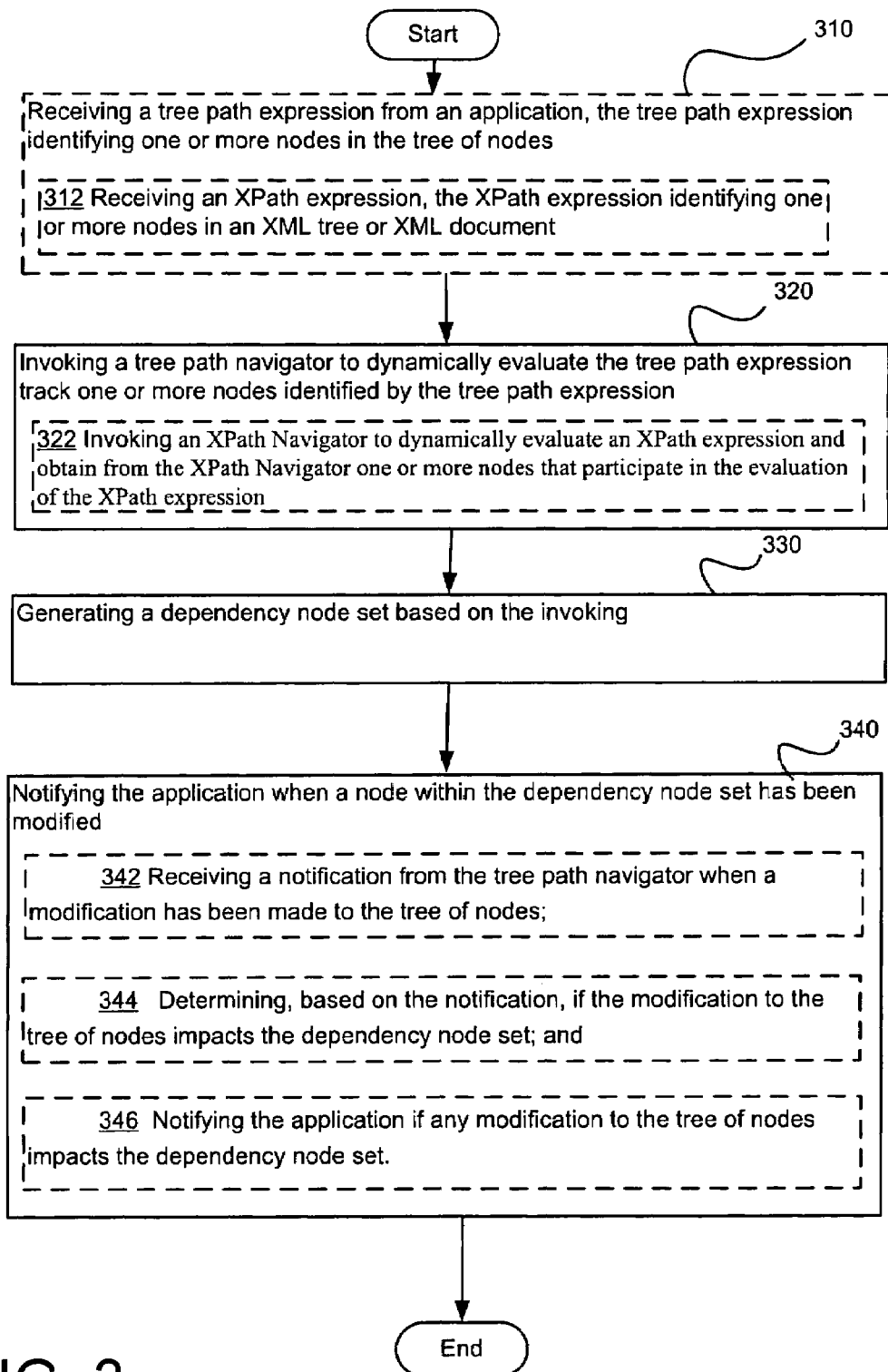
FIG. 3 is a flow chart illustrating a technique for binding an application to one or more data nodes according to an example embodiment.

FIG. 3 is a flow chart illustrating a technique for binding an application to one or more data nodes according to an example embodiment. At 310, a tree path expression is received from an application. The path expression may identify one or more nodes in a tree of nodes. For example, at 312, an XPath expression may be received that identifies one or more nodes in an XML tree or an XML document.

At 320, a tree path navigator is called or invoked to evaluate the tree path expression to track one or more nodes identified by the XPath expression. For example, at 322, an XPath navigator may be invoked or called to dynamically evaluate an XPath expression and obtain (from the navigator) one or more nodes that participate in the evaluation of the XPath expression. A pointer to the one or more nodes may be obtained (e.g., provided by the XPath navigator).

At 330, a dependency node set may be generated based on the invoking of 320, e.g., based on the one or more nodes obtained from the Xpath navigator that may participate in the evaluation of the XPath expression.

At 340, an application may be notified when a node within the dependency node set has been modified. This may be done, for example by: receiving a notification from the tree path navigator (e.g., XPath navigator) when a modification has been made to the tree of nodes (342); determining, based on the notification, if the modification to the tree of nodes (e.g., XML tree) impacts or affects the dependency node set (344); and notifying the application if any modification to the tree of nodes impacts or affects the dependency node set (346).

Figure 4:
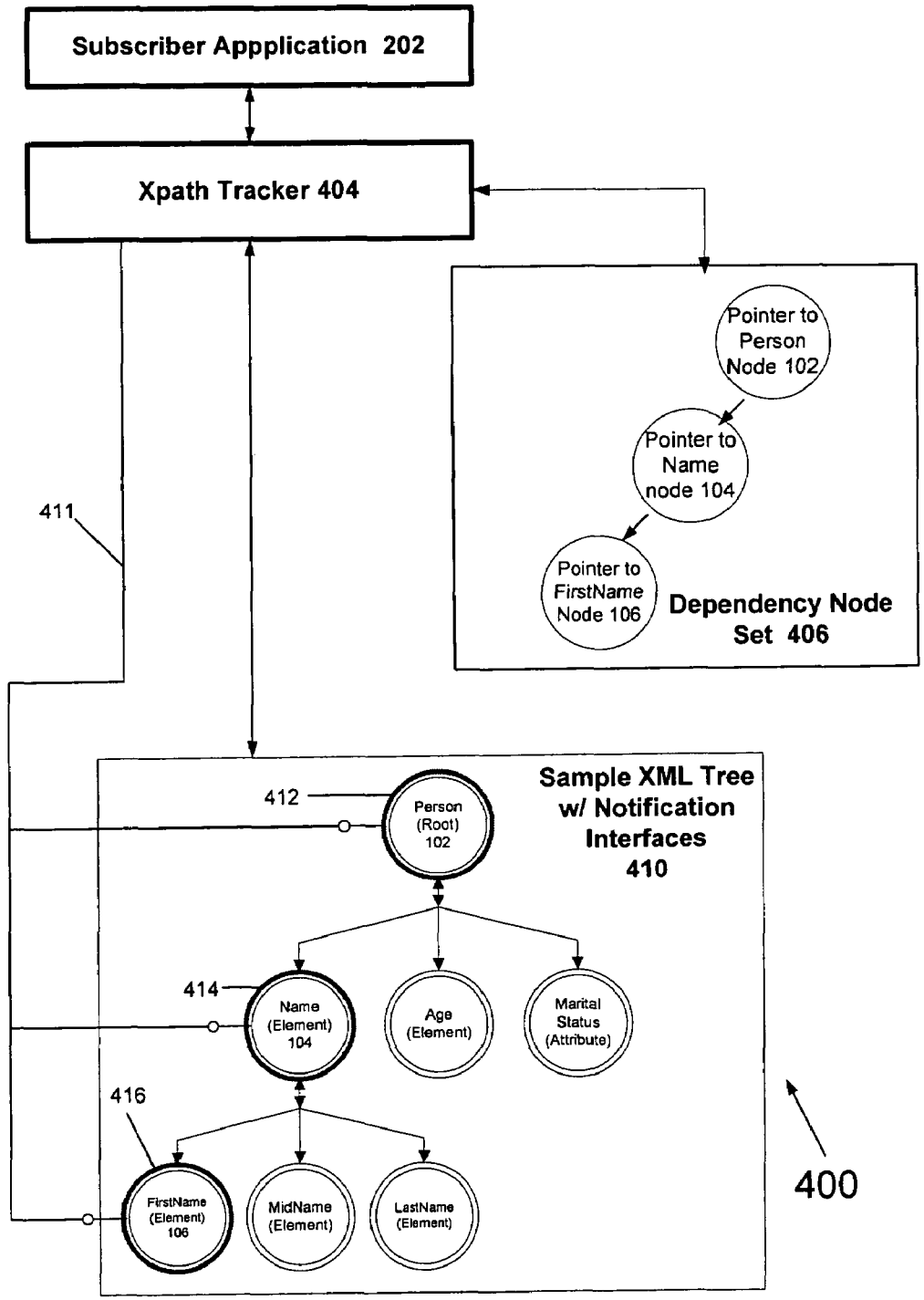
FIG. 4 is a block diagram of a system to bind an application to one or more data nodes according to another example embodiment.

FIG. 4 is a block diagram of a system to bind an application to one or more data nodes according to another example embodiment. System 400 is similar to system 200 (FIG. 2), and the differences between system 400 and system 200 will be briefly described. System 400 may include a subscriber application 202 which may use one or more nodes (e.g., nodes of interest) in XML tree 410. Although not required, according to an example embodiment, XPath navigator (e.g., 208) may not be available or may not be used in this example.

XML tree 410 may include a number of nodes, such as nodes 102, 104 and 106, among other nodes, for example. A notification interface may be provided for one or more (or even all) of the nodes within XML tree 410 to provide a notification to XPath tracker 404 when a node within XML tree 410 is changed or modified. For example, node 102 may include a notification interface 412, node 104 may include a notification interface 414, and node 106 may include a notification interface 416. Each notification interface (e.g., 412, 414 and 416) may provide a change notification via line 411 to XPath tracker 404 when the corresponding node in XML tree 410 is modified.

In an example embodiment, each notification interface may comprise a wrapper to wrap one or more of the nodes to seal access paths for one or more of the nodes and provide a gateway for access. By sealing existing access paths, and providing a new gateway, inputs or modifications may be received only via the new gateway in the notification interface. Therefore, in one example embodiment, any changes or modifications to the node(s) may be detected via the notification interface or wrapper, and a change notification may be sent via line 411 to XPath tracker 404 when such a change or modification to a node occurs. The notification interface may include a separate notification interface or wrapper for each node (as shown in FIG. 4), or may provide a notification interface or wrapper for a plurality (or even all) of the nodes (not shown) within XML tree 410, as examples.

According to an example embodiment, XPath tracker 404 may receive an XPath expression from application 202 (e.g., corresponding to one or more nodes used by application 202 or of interest to application 202). In this example, an XPath navigator (e.g., 208) with notification may not necessarily be used, or may be unavailable, for instance. Therefore, XPath tracker 404 may manually or statically. In this example embodiment, XPath tracker 404 (or its agent such as a simplified navigator, not shown) may obtain a node identified by an XPath expression, and then generate a dependency node set 406 based on this obtained node(s). However, in this example embodiment, a navigator or other agent does not typically provide or output the nodes that participate in the evaluation of the expression, but does provide the node identified by the Xpath expression. Therefore, in this example, the dependency node set 406 may be statically generated, or generated based on the expression itself and based on the node that is obtained (node identified by the XPath expression). Therefore, in this example embodiment, the Xpath expression is statically evaluated and the dependency node set 406 is statically generated based on the expression and the node identified by the expression (e.g., not generated on the fly during the Navigator's traversing or navigation of the XML tree, as done in FIG. 2). In this example embodiment, the Xpath tracker (or its agent, such as a simplified navigator, not shown) would typically obtain only the nodes identified by the expression, not all the nodes that participate in its evaluation, for example.

Based on this manual or static evaluation of the expression, the XPath tracker 404 may generate a dependency node set 406 corresponding to the XPath expression. The dependency node set 406 may, for example, include pointers to the node(s) corresponding to the XPath expressions received from application 202 (including nodes identified by the expression and nodes that participate in the evaluation of the expression).

XPath tracker 404 may receive a change notification via line 411 from a notification interface associated with a node(s) in XML tree 410 when one or more nodes are modified or changed. This change notification may include, for example, a pointer to the changed node, the old value and the new value. XPath tracker 404 may, for example, compare the pointer or memory address of the changed node to the dependency node set 406. If the pointer matches the dependency node set 406, this may indicate that the change or modification may impact the dependency node set 406 or the nodes in use or of interest to the application 202. Therefore, XPath tracker 404 may provide application 202 with a notification of the change or modification. This notification to application 202 may indicate that a change to a node of interest has occurred, may or may not provide the pointer to the changed node, and may or may not provide the old and new values for the changed node, for example.

According to an example embodiment, notification interfaces may be provided for (each of) a plurality of nodes in XML tree 410, including nodes within and not within dependency node set 406. Thus, XPath tracker 404 may receive change notifications for nodes within and not within the dependency node set 406. In such case, a comparison of pointers, for example, may be used to determine if such a node change may impact the dependency node set 406.

In another example embodiment, notification interfaces may be provided only for those nodes being tracked by XPath tracker 404, e.g., notification interfaces may be generated and applied to nodes in XML tree 410 upon request by XPath tracker 404 based upon evaluation of a received expression. In such an embodiment, the analysis at XPath tracker 404 may be simplified since, for example, a change notification may be sent to XPath tracker 404 only when a node within the dependency node set is modified. Thus, in such a case, the extra step of comparing pointers may not be necessary, for example.

Figure 5:
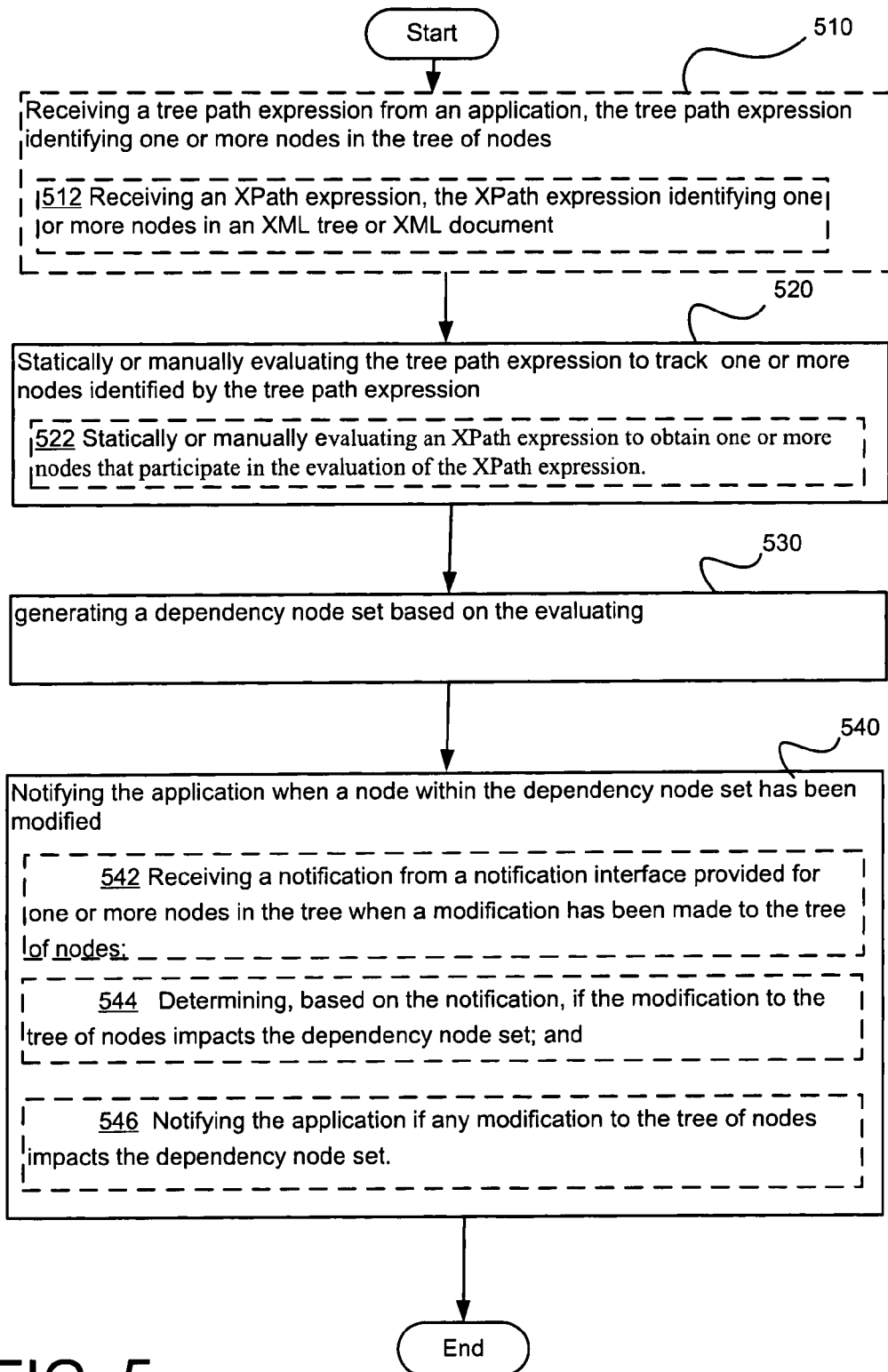
FIG. 5 is a flow chart illustrating a technique for binding an application to one or more data nodes according to another example embodiment.

FIG. 5 is a flow chart illustrating a technique for binding an application to one or more data nodes according to another example embodiment. At 510, a tree path expression may be received from an application. The tree path expression may identify one or more nodes in a tree of nodes. For example, an XPath expression may be received identifying one or more nodes in an XML tree or XML document (512).

At 520, the tree path expression may be manually or statically evaluated to track one or more nodes identified by the tree path expression. For example, an XPath expression may be manually or statically evaluated to obtain one or more nodes that participate in the evaluation of the XPath expression (522).

At 530, a dependency node set may be statically generated based on statically evaluating of the tree path expression (e.g., based on evaluation of the XPath expression).

At 540, an application may be notified when a node within the dependency node set has been modified. This may include, for example: receiving a notification from an notification interface provided for one or more nodes in the tree when a modification has been made to the tree of nodes (542); determining, based on the notification, if the modification to the tree of nodes impacts or affects the dependency node set (544); and notifying the application if any modification to the tree of nodes impacts or affects the dependency node set (546).

In yet another example embodiment, an XPath tracker may dynamically select to either invoke an XPath navigator (e.g., if available) to dynamically evaluate the XPath expression), or may manually or statically evaluate the expression (e.g., if a navigator is not available).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method of binding an application to one or more nodes in a tree of nodes comprising:
   receiving a tree path expression from an application, the tree path expression identifying the one or more nodes in the tree of nodes to be returned as output to the tree path expression;
   invoking a tree path navigator to dynamically evaluate the tree path expression to track and return nodes that participate in the evaluation of the tree path expression when traversing across the tree of nodes to the one or more nodes identified by the tree path expression;
   generating a dependency node set based on one or more nodes returned by the tree path navigator; and
   notifying the application to re-evaluate the received tree path expression to obtain updated data when a node within the dependency node set has been modified.

2. The method of claim 1 wherein the notifying the application comprises:
   receiving a notification from the tree path navigator when a modification has been made to the tree of nodes;
   determining, based on the notification, if the modification to the tree of nodes impacts the dependency node set; and
   notifying the application if any modification to the tree of nodes impacts the dependency node set in a way that affects the result of the received tree path expression.

3. The method of claim 1 wherein the receiving a tree path expression comprises receiving an XPath expression, the XPath expression identifying one or more nodes in an XML tree or XML document.

4. The method of claim 1 wherein the invoking comprises invoking an XPath Navigator to dynamically evaluate an XPath expression in order to obtain one or more nodes that participate in the evaluation of the XPath expression.

5. The method of claim 1 wherein the notifying the application if any modification to the tree of nodes impacts the dependency node set comprises providing at least a pointer to the application of a node in the node set that is impacted by a modification to the tree of nodes.

6. The method of claim 2 wherein the receiving a notification from the tree navigator comprises receiving a pointer to a changed node in an XML tree or XML document from an XPath Navigator when a change has been made to the node.

7. An apparatus comprising:
   a tree navigator adapted to evaluate a tree path expression identifying one or more nodes to be returned as output to the tree path expression and to provide one or more nodes within a tree of nodes that participate in the evaluation of the tree path expression when traversing across the tree of nodes to the one or more nodes identified by the tree path expression, the tree navigator further adapted to provide a notification when a modification occurs within the tree of nodes; and
   a tracker adapted to receive a tree path expression from an application and to invoke the tree navigator to dynamically evaluate the tree path expression, the tracker further adapted to generate a dependency node set based on values returned by the tree navigator based on the tree path expression and to cause the application to re-evaluate the tree path expression to obtain updated data when a node within the dependency node set has been modified.

8. The apparatus of claim 7, wherein the tracker is further adapted to provide a notification to the application when a node within the dependency node set has been modified.

9. The apparatus of claim 7 wherein the tracker is further adapted to:
   receive a notification from the tree navigator when a modification has been made to the tree of nodes;
   determine, based on the notification, if the modification to the tree of nodes impacts the dependency node set; and
   notify the application if any modification to the tree of nodes impacts the dependency node set.

10. The apparatus of claim 7 wherein the tree navigator comprises an XPath navigator adapted to dynamically evaluate an XPath expression and to provide one or more nodes within an XML document or XML tree that participate in the evaluation of the XPath expression, the XPath navigator further adapted to provide a notification when a modification occurs to the XML tree or XML document.

11. The apparatus of claim 7 wherein the tree navigator comprises an XPath navigator, and wherein the tracker comprises an XPath tracker adapted to invoke the XPath navigator to dynamically evaluate an XPath expression to track one more nodes identified by the XPath expression within an XML tree or XML document, the XPath tracker further adapted to dynamically generate a dependency node set based on values returned by the XPath navigator, the XPath tracker further adapted to provide a notification to the application when a node within the dependency node set has been modified.

12. The apparatus of claim 7, wherein the notification comprises a pointer to a modified node.

13. An apparatus comprising:
   a notification interface provided for one or more nodes of a tree of nodes, the notification interface adapted to provide a notification when a node within the tree of nodes is modified; and
   a tracker adapted to receive a tree path expression from an application the tree path expression identifying one or more nodes to be returned as output to the tree path expression, the tracker adapted to statically evaluate the tree path expression to generate a dependency node set from the tree of nodes based on the nodes that participate in the evaluation of the tree path expression when traversing across the tree of nodes to the one or more nodes identified by the tree path expression, the tracker further adapted to receive a notification from one of the notification interfaces when a node from the dependency node set is modified and to cause the application to re-evaluate the tree path expression to obtain updated data when a node from the dependency node set has been modified.

14. The apparatus of claim 13 wherein the tracker is further adapted to notify the application when a node from the dependency node set is modified.

15. The apparatus of claim 13 wherein the notification interface comprises a wrapper to wrap one or more of the nodes to seal access paths for the one or more nodes and provide a gateway for access and thereby provide notification when the one or more nodes are modified.

16. The apparatus of claim 13 wherein the notification interface comprises a wrapper to wrap a plurality of nodes of the tree to seal access paths for the plurality of nodes and provide a gateway for access and thereby provide notification when the one or more of the plurality of nodes are modified.

17. The apparatus of claim 13 wherein the notification interface comprises a wrapper to wrap each of the nodes within the node set of the tree and to provide a gateway for access to the corresponding node and thereby provide notification when the corresponding node is modified.

18. The apparatus of claim 13 wherein the notification interface comprises a notification interface for one or more nodes of an XML tree or XML document, the notification interface adapted to provide a notification when a node within the XML tree or XML document is modified.

19. The apparatus of claim 18 wherein the tracker comprises an XPath tracker adapted to receive an XPath expression from an application and to statically evaluate the Xpath expression to generate a dependency node set including one or more nodes that participate in the evaluation of the XPath expression, the XPath tracker further adapted to receive a notification from one of the notification interfaces when a node in the XML tree or XML document is modified, and to notify the application of the modification to the node if the modification impacts the dependency node set.

20. The apparatus of claim 18 wherein the notification comprises a pointer to a modified node.

* * * * *

UNITED STATES PATENT AND TRADEMARK OFFICE
CERTIFICATE OF CORRECTION

| | |
|---|---|
| PATENT NO. | : 7,505,994 B2 |
| APPLICATION NO. | : 11/320208 |
| DATED | : March 17, 2009 |
| INVENTOR(S) | : Haroon Ahmed et al. |

It is certified that error appears in the above-identified patent and that said Letters Patent is hereby corrected as shown below:

In column 11, line 25, in Claim 13, delete "application" and insert -- application, --, therefor.

Signed and Sealed this
Third Day of May, 2011

David J. Kappos
*Director of the United States Patent and Trademark Office*